United States Patent [19]

Whitman

[11] 4,025,949
[45] May 24, 1977

[54] SYMMETRICAL ASTIGMATIC FOCUS SENSING SYSTEM

[75] Inventor: Robert L. Whitman, Oak Park, Ill.

[73] Assignee: Zenith Radio Corporation, Glenview, Ill.

[22] Filed: Dec. 31, 1975

[21] Appl. No.: 645,490

[52] U.S. Cl. .............................. 358/128; 250/201
[51] Int. Cl.² .................. H04N 5/76; G11B 7/12; G11B 17/00
[58] Field of Search ....... 178/6.6 R, 6.6 DD, 6.7 A; 179/100.3 V, 100.3 G; 250/201, 202, 204; 350/190, 255; 340/173 LT, 173 LM

[56] References Cited

UNITED STATES PATENTS

| | | | |
|---|---|---|---|
| 3,596,101 | 7/1971 | Somea | 250/204 |
| 3,913,076 | 2/1974 | Lehureau | 340/173 LT |
| 3,925,603 | 12/1975 | Naruse et al. | 178/6.6 R |
| 3,969,576 | 7/1976 | Boonstra et al. | 178/6.6 R |
| 3,971,002 | 7/1976 | Bricot et al. | 340/173 LT |
| 3,983,317 | 9/1976 | Glorioso | 178/6.6 R |

Primary Examiner—Raymond F. Cardillo, Jr.
Attorney, Agent, or Firm—Cornelius J. O'Connor

[57] ABSTRACT

An improved focus error correction system for use in an optical playback apparatus features a collimating lens which, in conjunction with a pair of cylinder lenses, form first and second astigmatic (line) images of the reading spot which are monitored by a photodetector to develop an error signal indicative of the sense and extent of defocusing of the reading spot.

6 Claims, 6 Drawing Figures

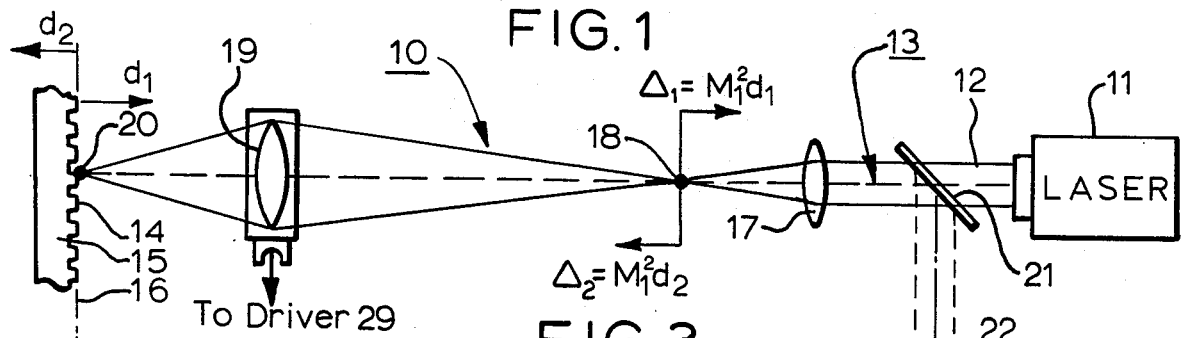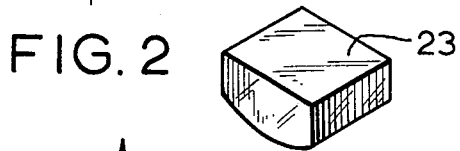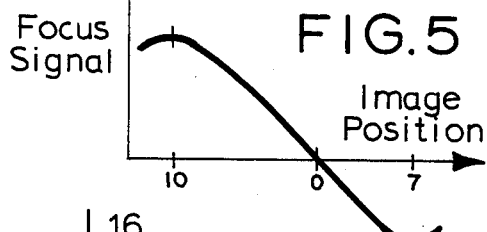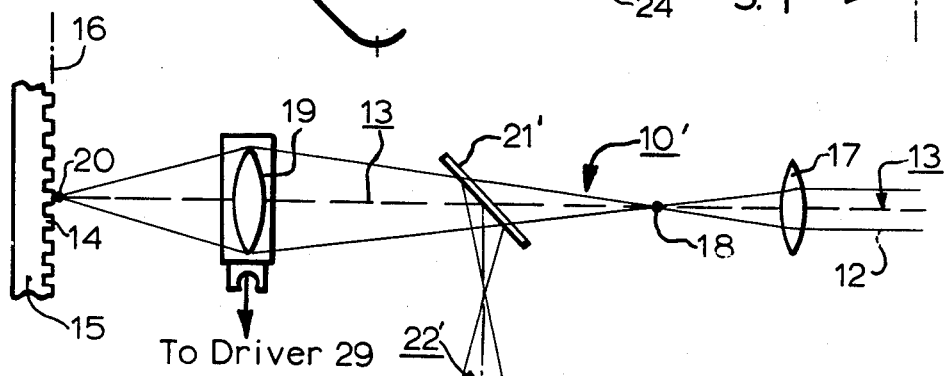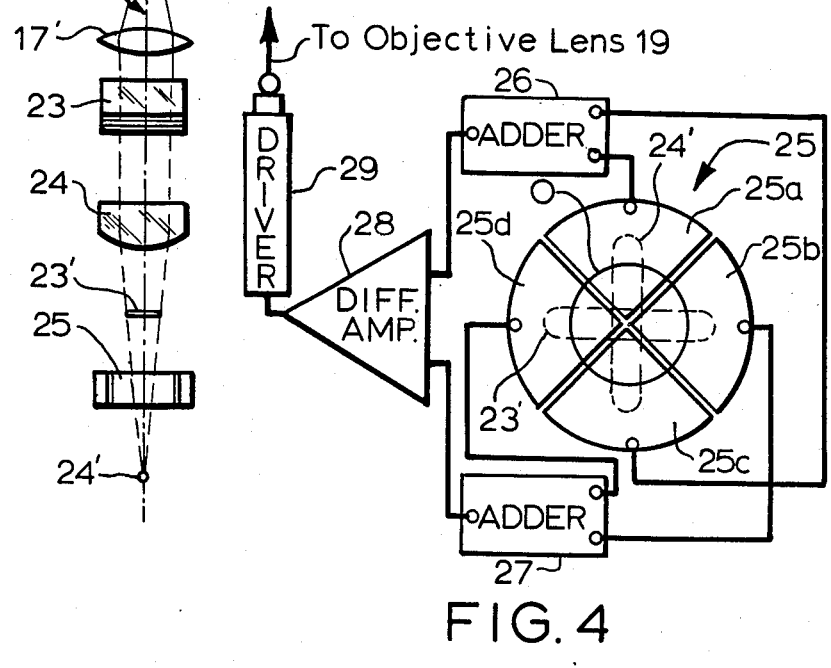

SYMMETRICAL ASTIGMATIC FOCUS SENSING SYSTEM

BACKGROUND OF THE INVENTION

This invention relates in general to an optical system for reading a video disc. More particularly, the invention is concerned with an improved focus error correction system for deriving a signal indicative of the extent and sense of departure of a reading light spot from registration with the storage track of a video disc.

In the field of video information storage and retrieval, the video disc record has been proposed as an adjunct to the conventional home color television receiver in order to augment its utility to the end that such a receiver can be employed as a playback device for pre-recorded video and audio program materials. A record of the type herein considered can comprise a vinyl disc having video or other information stored in a spiral track which physically can take the form of a train of pits and lands. Such a disc is described and claimed in copending patent application Ser. No. 439,680, filed Feb. 4, 1974, in the name of Adrianus Korpel, now U.S. Pat. No. 3,931,459, and assigned to the same assignee as the subject invention.

In order to retrieve the stored information, it is necessary to support the disc for rotation in a reading plane and to maintain a focused reading beam, desirably derived from a laser, in registration with the storage track. The maintaining of focus registration has, in the past, contemplated the derivation of an error signal, indicative of an out-of-focus condition, for use in a servo control system. Additionally, there has been resort to aerodynamic disc stabilizers to maintain such registration.

Insofar as the former is concerned, i.e., detection of an error signal, it is known to employ a cylinder lens for the purpose of developing astigmatic images and then to monitor the position of these images with a photodetector. The output signal of this detector is indicative of a displacement, in space, of these images which displacement, in turn, is indicative of an out-of-focus condition, that is, a departure of the record track from the reading plane.

However, experience with the aforementioned known arrangement has shown that the error signal derived in characterized by a undesirable shortcoming in that this signal is not linear as a function of the defocused condition. In other words, the extent to which the focus error signal changes, with respect to track departure from the reading plane in one direction, is not the same as the extent to which the signal changes when the track departs from the plane in the opposite direction. As a result, error signal capture of the focus servo control system is not symmetrical, i.e., the capture affect for one direction of defocusing is less expensive than the capture affect for the opposite direction of defocusing.

OBJECTS OF THE INVENTION

Accordingly, it is a general object of the invention to provide an improved focus error correction system for an optical playback apparatus.

It is a particular object of the invention to provide a focus error correction system for use in a video disc playback apparatus.

It is a specific object of the invention to provide, in a video disc playback apparatus, an improved focus correction system in which the focus error signal response remains linear over an extended capture range of the focus servo control system.

It is further object of the invention to provide a focus correction system which permits maximum utilization of the dynamic capture range of the focus servo control system.

SUMMARY OF THE INVENTION

An improved focus error correction system for use in an optical playback apparatus in which a multi-turn information storage track of a video record is supported in a reading plane for scansion by a reading beam derived from a source of coherent light to retrieve information stored in the track. The readout system comprises means for directing the reading beam along a first optical path extending between the source of coherent light and the storage track. Means are disposed in this first path for converging the reading beam to an intermediate light spot. An objective lens, included in the first optical path, serves to focus the light energy emanating from the intermediate spot into a reading spot on the storage track. Registration of this reading spot on the track corresponds to optimum focusing condition when the track is positioned in the reading plane. A beam splitter is also included in the first optical path for establishing a second optical path for the light reflected from the track and for relaying a reflected image of the reading spot into this second path. A pair of spaced apart orthogonally disposed cylinder lenses, of substantially identical focal lengths, is positioned along the second path to comprise, in conjunction with the light converging means, first and second telescopes for forming respective first and second astigmatic images of the reading spot along the second path. These images are spaced apart a distance substantially equal to the separation of the cylinder lenses. The spatial positions of the astigmatic images are effectively displaceable along the second path distances which are proportional to a misregistration between the storage track and the reading plane. Photoreceptor means are effectively interposed in the second path approximately midway between the first and second astigmatic images. The photoreceptor responds to relative variations in received light energy attributable to displacement of the astigmatic images, due to the aforesaid misregistration, to develop an error signal indicative of the sense and extent of such departure from the optimum focusing condition. Finally, means responsive to the error signal are provided for effecting a relative displacement between the objective lens and the track to re-establish the optimum focusing condition.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings, in the several figures of which like reference numerals and indicia identify like elements and in which:

FIG. 1 is a representation of part of an optical video playback apparatus featuring a focus error detector constructed in accordance with the invention;

FIG. 2 is a perspective view of a cylinder lens of the type employed in the detector in FIG. 1;

FIG. 3 is a side view of the error detector portion of the playback apparatus taken along lines 3—3 in FIG. 1;

FIG. 4 depicts a photocell and servo amplifier arrangement, including an enlarged view of the photocell of FIG. 1, for utilizing the focus error signal derived by the detector shown in FIGS. 1, 3 or 6;

FIG. 5 depicts the dynamic focus error signal characteristic of a prior art focus error correction system; and FIG. 6 illustrates an alternate embodiment of the focus error detector shown in FIG. 1.

DESCRIPTION OF THE PREFERRED EMBODIMENT

Before considering the details of the focus error correction system proposed herein and its advantages over the prior art, attention is directed to the fact that the optical video playback apparatus shown in FIG. 1 is confined, in principal, to the focus correction system. Insofar as apparatus for supporting a video disc record and rotating, or flying it in a reading plane is concerned, there is described in U.S. Pat. No. 3,838,460, assigned to the same assignee as the subject invention, a video player capable of performing those functions. Additionally, a carriage arrangement for enabling a read beam to monitor a spiral storage track is described in U.S. Pat. No. 3,919,562, also assigned to the assignee of the present invention. While these mechanisms form no part of the subject invention, by way of augmenting the teaching of the subject disclosure, the teachings of the aforementioned patents are expressly incorporated herein by reference.

Turning now to FIG. 1, the optical playback apparatus 10 shown therein comprises means, including a laser 11, from which a beam 12 of coherent light is derived and directed along a first optical path 13 extending from the laser to the information storage track 14 of a video disc record 15. The disc may be mounted upon a hub, in the fashion shown in U.S. Pat. No. 3,838,460, so that track 14 is supported in a reading plane 16 for scansion by read beam 12 to retrieve information stored in the track. Means, in the form of lens 17, is disposed in optical path 13 for converging beam 12 to an intermediate light spot 18. An objective lens 19, also positioned in optical path 13, focuses the light energy emanating from spot 18 into a reading spot 20 on storage track 14. Registration of the reading spot on the track corresponds to the optimum focusing condition when the track is positioned in the reading plane.

A beam splitter 21 is included in optical path 13 for establishing a second optical path 22 for the light reflected from track 14, specifically, the beam splitter serves to relay a reflected image of reading spot 20 into path 22. It should be noted at this juncture that, as to light reflected from track 14, lens 17 constitutes a collimating lens. A pair of spaced apart orthogonally disposed cylinder lenses 23, 24, each of substantially identical focal lengths $f_{23}$, $f_{24}$, is positioned along path 22. Each of cylinder lenses 23, 24 can take the form of the lens illustrated in FIG. 2. As there shown, such a lens has only one surface of curvature, that being a section of a cylinder. Lenses 23, 24 comprise, in conjunction with lens 17 which, as noted, now serves as a collimating lens, first and second telescopes $T_{17-23}$ and $T_{17-24}$ for forming along path 22 respective first and second astigmatic line images 23', 24' of intermediate spot 18 which, of course, is an image of reading spot 20. If the focal length $f_{17}$ of the collimating lens 17 is the same as the focal lengths of the cylinder lenses, then the separation between the collimating lens and a point midway between the cylinder lenses is $2f_{17}$. Each of telescopes $T_{17-23}$ and $T_{17-24}$ has a longitudinal magnification factor $1-(\Delta\delta/f)$, where $\Delta$ is one-half the cylinder lens separation and $\delta$ is the focus error at intermediate spot 18. As seen in FIGS. 1 and 3, images 23' and 24' are elongated forms of spot 18 and are spaced apart along path 22 a distance approximately equal to the separation of cylinder lenses 23 and 24. As will be shown, the spatial positions of images 23', 24' are displaceable along path 22 distances proportional to any misregistration between track 14 and reading plane 16.

A photoreceptor means 25 comprising a multi-section light detector, specifically, the four-element $25_a$, $25_b$, $25_c$, $25_d$ diode shown in FIG. 4, is effectively interposed in path 22 approximately midway between image 23' and image 24'. At this point in path 22, the light rays passing through lens 23 and 24 form a complex pattern, substantially in the shape of a circle 0, on the surface of the photoreceptor, see FIG. 4. Also shown in FIG. 4 are projections of line images 23', 24' which are depicted by broken-line construction.

Light detector 25 derives a focus error signal which, in conjunction with a servo system to be described, restores the optimum focus condition should track 14 depart from reading plane 16. To this end, the four elements of light detector 25 are connected so that elements $25_a$ and $25_c$ are coupled to the input terminals of an adder 26 while elements $25_b$ and $25_d$ are connected to the input terminals of the adder 27. The outputs of adders 26 and 27 are applied to a differential amplifier 28 that derives an error correction signal which is applied to a driver 29. This driver is then coupled to objective lens 19 to effect a displacement thereof to compensate for any departure of track 14 from the reading plane.

FIG. 3, which shows a sideview of cylinder lenses 23 and 24, illustrates, in conjunction with FIG. 1, the orthogonal relationship of the cylinder lenses as well as the orthogonal relation of their astigmatic line images 23', 24'. As there shown the light rays reflected by beam splitter 21, upon passing through cylinder lens 23, for example, are converged in one direction only to form the astigmatic line image 23'. In like fashion, cylinder lens 24 converges the light rays incident thereon to form line image 24' which, by virtue of the orthogonal relation of the lenses, is oriented perpendicular to image 23'.

The elemental diodes are so oriented in path 22 that, when the record track departs in one direction from the reading plane, the pattern intercepted by light detector 25 approaches the configuration of line image 23' so that light impinges principally upon diode elements $25b$ and $25d$. Conversely, when the record departs in the opposite direction, the pattern intercepted by detector 25 approaches the configuration of line image 24' so that light now impinges principally upon diode elements $25a$ and $25c$. Under the condition of optimum focus, the circular pattern 0 overlies all four diode elements, in which situation the output of differential amplifier 28 is zero. However, and in a manner to be described, photoreceptor 25 will respond to relative variations in the positions of images 23', 24' and O, variations which are attributable to misregistration between storage track 14 and reading plane 16, to develop an error signal indicative of the sense and extent of such a departure from the optimum focusing condition.

Images 23' and 24' occupy spatial positions along optical path 22 but they are displaceable along the path when the reading spot reflected from the record track is displaced due to a departure of the record track 14, for example, to the right as viewed in FIG. 1, from the reading plane 16. This displacement occurs because the light spot reflected from the record track will no longer image at intermediate spot 18 but will be displaced in the same direction that the track moved and by a distance $\Delta_1$, which is equal to $M_1^2 d_1$ where $M_1$ is the magnification of objective lens 18 and $d_1$ is the displacement of the track. The now displaced intermediate spot 18 will, upon being relayed by the telescopes cause astigmatic light images 23' and 24' to be displaced also, downward as viewed in FIG. 1. In particular, image 23' is displaced a distance $D_{23}$, equal to the square of the product of the magnification factor $M_1$ of the objective lens and the magnification $M_2$ of $T_{17-23}$ telescope times the track displacement $d$, that is, $(M_1 M_2)^2 d_1$. In like fashion, image 24' is displaced a distance $D_{24'}$ equal to the square of the product of $M_1$ and the magnification $M_3$ of telescope $T_{17-24}$ times the track displacement $d$, or, $(M_1 M_3)^2 d_1$.

On the other hand, if the track departs in the opposite direction a distance $d_2$, spot 18 moves to the left a distance $\Delta_2$ equal to $M_1^2 d_2$. As a consequence, line images 23' and 24' are displaced upward respective distances $D_{23''} = (M_1 M_2)^2 d_2$ and $D_{24''} = (M_1 M_3)^2 d_2$. It is now apparent that any movement of the storage track from the reading plane will be relayed via the beam splitter to optical path 22 and manifested there as spatial displacements of the astigmatic line images 23' and 24'. The detection of these spatial displacements, which are manifested in the form of variations in the light intensities at the photodiode, will now be described.

The circular image pattern 0 displayed on light detector 25 in FIG. 4 is indicative of optimum focusing condition between the reading spot and the record track. As shown, this circular pattern is seen to overlie substantially equal increments of each of the diode elements.

As noted above, there are actual spatial displacements of line images 23' and 24' proportional to the displacement of the record track from its reading plane when defocusing is experienced. Thus, if it be assumed that the images 23', 24' are displaced downward, as viewed in FIG. 1, image 23' will move toward the diode plane and cause an increase in the light intensity cast upon diode elements $25_b$ and $25_d$ while the light cast upon diode elements $25_a$ and $25_c$ will diminish. As a result, adder 27 will experience an increase in applied signal while adder 26 will experience a corresponding decrease in the input signal thereto. Difference amplifier 28, sensing an increase in signal output from adder 27, and a corresponding decrease from adder 26, will derive a control signal having an amplitude and polarity indicative of a condition in which the record track has departed from its reading plane in a direction toward objective lens 19. Driver 29, in response to this signal, will then displace objective lens 19 in a direction to re-establish reading spot 22 in optimum focusing condition with track 14.

On the other hand, if the images 23', 24' are displaced upward (again, as viewed in FIG. 1) because of a departure of the track in the opposite direction, image 24' now moves closer to the photodetector 25 to cause an increase in light intensity upon diode elements $25_a$ and $25_c$. At the same time, the light thrown upon diode elements $25_b$ and $25_d$ is reduced. Adder 26 now experiences an increase in applied signal while signal input to adder 27 is correspondingly reduced. Difference amplifier 28 now derives a control signal having an amplitude and polarity indicative of a condition in which the record track has departed in a direction away from objective lens 19. In response to this signal, driver 29 displaces lens 19 in a direction to re-establish the optimum focusing condition.

In the prior practice when a cylindrical lens was employed to generate line images, the spacing of a resultant pair of images, relative to a position corresponding to optimum focusing (zero defocus), was not symmetrical. More particularly, and as depicted in FIG. 5, a plot of focus signal amplitude as a function of line image position demonstrates that the distance over which the curve remains moderately linear outward from the zero cross-over position is greater in one direction than in the other. Accordingly, if a photodetector is located at a position corresponding to zero defocus, it is apparent that, in the prior art single cylinder lens arrangement, the focus error signal is not symmetrical as a function of defocus. From a practical standpoint, this means that the focus control servo system would have a more extended capture range in one direction of defocusing than in the other. This is most undesirable since, short of resort to some sort of biasing scheme to effectively place the zero cross-over point midway in the capture range, one cannot compensate for such asymmetry by assigning the greater capture range to one direction of defocusing because the direction of defocus is unpredictable.

On the other hand, the subject correction system avoids the aforementioned shortcoming in providing a system in which a pair of cylinder lenses are used in conjunction with a collimating lens to form a pair of telescopes for deriving a pair of symmetrically spaced, relative to the photodetector, line images. The symmetry of the subject system allows one to position the photoreceptor in the center of the linear range of line image displacements. Moreover, the disclosed arrangement is conducive to maximum isolation between focus error correction signals and radial tracking signals.

In the principal embodiment described above, the lens 17 served, not only as the means for forming intermediate spot 18, but also as a collimating lens for imaging the reflected light at spot 18 into the second optical path 22. In this regard, and with reference to playback apparatus 10' shown in FIG. 6, it is recognized that a beam splitter 21' can be positioned to the left of intermediate spot 18 to reflect an image of focus spot 20 into a second optical 22' to form an intermediate spot 18' in path 22'. This then would entail the addition to path 22' of a second collimating lens 17' in order to form with cylinder lenses 23 and 24 the pair of telescopes required to derive the symmetrically spaced line images 23', 24'. An advantage of this embodiment is that the height of the line images may be varied by the choice of lens 17', while in the principal embodiment, it could never be larger than the diameter of beam 12, which in some cases, would be impractically small for available photodetectors.

While there have been described particular embodiments of the present invention, it is apparent that changes and modifications may be made therein without departing from the invention in its broader aspects. The aim of the appended claims, therefore, is to cover all such changes and modifications as fall within the true spirit and scope of the invention.

What is claimed is:

1. In an optical playback apparatus in which a multi-turn information storage track of a video record is supported in a reading plane for scansion by a reading beam derived from a source of coherent light to retrieve information stored in said track, an improved focus error correction system comprising:

means for directing said reading beam along a first optical path extending between said source of coherent light and said storage track;

means disposed in said first optical path for converging said reading beam to an intermediate light spot;

an objective lens, included in said first optical path, for focusing the light energy emanating from said intermediate spot into a reading spot on said storage track, registration of said reading spot on said track corresponding to optimum focusing condition when said track is positioned in said reading plane;

a beam-splitter, also included in said first optical path, for establishing a second optical path for light reflected from said track and for relaying a reflected image of said reading spot into said second path;

a pair of spaced apart orthogonally disposed cylinder lenses of substantially identical focal lengths positioned along said second path and comprising, in conjunction with said light converging means, first and second telescopes for forming respective first and second astigmatic images of said reading spot along said second path, said images being spaced apart a distance substantially equal to the separation of said cylinder lenses, and, the spatial positions of said astigmatic images being effectively displaceable along said second path distances proportional to a misregistration between said track and said reading plane;

photoreceptor means effectively interposed in said second path approximately midway between said first and second astigmatic images and responsive to relative variations in the light energy of said astigmatic images, attributable to displacement of said images due to a misregistration between said storage track and said reading plane, for developing an error signal indicative of the sense and extent of such a departure from said optimum focusing condition; and means, responsive to said error signal, for effecting a relative displacement between said objective lens and said track to re-establish said optimum focusing condition.

2. A focus error correction system as set forth in claim 1 in which said photoreceptor means comprises a four-section diode.

3. A focus error correction system as set forth in claim 1 in which said beam-splitter is interposed between said converging means and said objective lens and which further includes a collimating lens included in said second optical path for forming in conjunction with said pair of cylinder lenses, first and second telescopes.

4. A focus error correction system as set forth in claim 1 in which said converging means comprises a collimating lens for the reflected light.

5. A focus error correction system as set forth in claim 4 in which said beam-splitter is interposed between said source of coherent light and said collimating lens.

6. A focus error correction system as set forth in claim 4 in which said collimating lens and said cylinder lenses have substantially the same focal lengths.

* * * * *